United States Patent
Matsumura et al.

(10) Patent No.: US 9,617,420 B2
(45) Date of Patent: Apr. 11, 2017

(54) EPOXY RESIN COMPOSITION

(75) Inventors: Misaki Matsumura, Hiratsuka (JP); Kazunori Ishikawa, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/110,415

(22) PCT Filed: Apr. 2, 2012

(86) PCT No.: PCT/JP2012/058939
§ 371 (c)(1),
(2), (4) Date: Oct. 7, 2013

(87) PCT Pub. No.: WO2012/141030
PCT Pub. Date: Oct. 18, 2012

(65) Prior Publication Data
US 2014/0031500 A1    Jan. 30, 2014

(30) Foreign Application Priority Data
Apr. 12, 2011    (JP) ................... 2011-088470

(51) Int. Cl.
| | | |
|---|---|---|
| *C08G 59/14* | (2006.01) | |
| *C08L 75/12* | (2006.01) | |
| *C08G 18/48* | (2006.01) | |
| *C08G 18/66* | (2006.01) | |
| *C08G 18/80* | (2006.01) | |
| *C08G 18/32* | (2006.01) | |
| *C08L 63/00* | (2006.01) | |
| *C09J 163/00* | (2006.01) | |
| *C08L 63/10* | (2006.01) | |

(52) U.S. Cl.
CPC .......... *C08L 75/12* (2013.01); *C08G 18/3206* (2013.01); *C08G 18/3215* (2013.01); *C08G 18/4854* (2013.01); *C08G 18/6674* (2013.01); *C08G 18/807* (2013.01); *C08G 18/8074* (2013.01); *C08G 18/8077* (2013.01); *C08L 63/00* (2013.01); *C08L 63/10* (2013.01); *C09J 163/00* (2013.01)

(58) Field of Classification Search
CPC .......... C08L 75/12; C08L 63/00; C08L 63/10; C08G 18/4854; C08G 18/6674; C08G 18/807; C08G 18/8074; C08G 18/8077; C08G 18/3206; C08G 18/3215; C09J 163/00
USPC ........................................ 525/528, 449, 459
See application file for complete search history.

(56) References Cited

U.S. PATENT DOCUMENTS

| 6,774,172 B1 | 8/2004 | Nakamura |
| 2010/0116433 A1 | 5/2010 | Finter et al. |

FOREIGN PATENT DOCUMENTS

| JP | H05-148337 | 6/1993 |
| JP | 2001-098245 | 4/2001 |
| JP | 2008-050389 | 3/2008 |
| JP | 2009-500484 | 1/2009 |

OTHER PUBLICATIONS

International Search Report, dated Apr. 20, 2012, 5 pages, Japan.

*Primary Examiner* — David Karst
(74) *Attorney, Agent, or Firm* — Thorpe North & Western

(57) ABSTRACT

The present technology is an epoxy resin composition containing an epoxy resin (A), a urethane resin (B) in which the terminal isocyanate of the urethane prepolymer is blocked by at least one of an ε-polycaprolactam, an oxime, or a pyrazole, and in which bisphenol A is included in the backbone of the aforementioned urethane prepolymer, and a curing agent (C).

10 Claims, No Drawings

EPOXY RESIN COMPOSITION

TECHNICAL FIELD

The present technology relates to an epoxy resin composition which exhibits excellent shock resistance and which can be used as a structural adhesive for an automobile, a vehicle or the like.

BACKGROUND

Epoxy resin compositions that contain epoxy resins exhibit excellent workability, and cured products obtained therefrom exhibit excellent electrical characteristics, heat resistance, adhesive strength, moisture resistance (water resistance), formability and the like. As a result, epoxy resin compositions have been widely used in the past as adhesives used to bond a variety of substrates in fields such as electrical/electronic components, vehicle components, electrical equipment, fiber reinforced plastics (FRP), sporting goods, structural materials and coating materials.

As materials related to this type of adhesive, epoxy resin compositions comprising, for example, an epoxy resin, a urethane-modified epoxy resin partially containing blocked isocyanate groups, a liquid rubber and a curing agent have been proposed (For example, see Japanese Unexamined Patent Application Publication No. H05-148337A). By heating the epoxy resin composition at a high temperature, some of the blocked isocyanate groups in the urethane-modified epoxy resin dissociate and react with hydroxy groups to form a compound containing hydroxy groups, and this compound reacts with, and bonds to, hydroxy groups in the epoxy resin, thereby exhibiting improved shear adhesive strength and peel strength as a structural adhesive for a vehicle or the like.

However, the epoxy resin composition disclosed in Japanese Unexamined Patent Application Publication No. H05-148337A is brittle, and therefore has problems such as poor adhesive properties and shock resistance. Therefore, a cured product obtained from the epoxy resin composition disclosed in Japanese Unexamined Patent Application Publication No. H05-148337A breaks easily when subjected to shocks.

In order to make up for these drawbacks in the above-mentioned epoxy resin composition, one method is to add an elastomer such as a urethane resin or a rubber as a flexible component, but it is still the case that there are few products having satisfactory shock resistance and an epoxy resin composition that exhibits excellent shock resistance while maintaining adhesive strength has yet to be found as a structural adhesive.

SUMMARY

The present technology provides an epoxy resin composition able to give a cured product having excellent shock resistance. The present technology is described in the following (1) to (5).

(1) An epoxy resin composition characterized by containing an epoxy resin (A),
a urethane resin (B) in which the terminal isocyanate of the urethane prepolymer is blocked by at least one of an ε-polycaprolactam, an oxime, or a pyrazole, and in which bisphenol A is included in the backbone of the aforementioned urethane prepolymer, and
a curing agent (C).

(2) The epoxy resin composition described in (1) above, which is characterized in that the aforementioned urethane resin (B) is obtained by reacting one or more polyol compounds selected from the group consisting of a poly(tetramethylene glycol) and a polycarbonate polyol with one or more isocyanate compounds selected from the group consisting of hexamethylene diisocyanate and isophorone diisocyanate.

(3) The epoxy resin composition described in (1) or (2) above, which is characterized in that a content of the aforementioned bisphenol A is such that a molar ratio of the number of moles of hydroxy groups in the aforementioned polyol and the number of moles of hydroxy groups in the bisphenol A ((polyol-OH)/(BisA-OH)) is not lower than 1/0.1 and not higher than 1/3.0.

(4) The epoxy resin composition described in any one of (1) to (3) above, which is characterized in that a content of the aforementioned urethane resin (B) is not less than 10 parts by mass and not more than 80 parts by mass per 100 parts by mass of the epoxy resin (A).

(5) The epoxy resin composition described in any one of (1) to (4) above, which is characterized by containing a rubber-modified epoxy resin (D).

The present technology achieves the effect of being able to obtain a cured product having excellent shock resistance.

DETAILED DESCRIPTION

The present technology is explained in detail below. However, the present technology is not limited by the embodiments of the technology (hereinafter referred to as the "embodiments") described hereinafter. Furthermore, the constituents described in the embodiments include constituents that could be easily conceived by a person skilled in the art and constituents that are essentially identical, or, in other words, are equivalent in scope. Moreover, the constituents described in the embodiments can be combined as desired.

The epoxy resin composition according to this embodiment (hereinafter referred to as "the composition according to this embodiment") contains an epoxy resin (A), a urethane resin (B) in which the terminal isocyanate of the urethane prepolymer is blocked by at least one of an ε-polycaprolactam, an oxime, or a pyrazole, and in which bisphenol A is included in the backbone of the aforementioned urethane prepolymer, and a curing agent (C).

Epoxy Resin (A)

The epoxy resin (A) is not particularly limited provided that it is a compound that has two or more epoxy groups in the molecule. Examples of the epoxy resin (A) include difunctional glycidyl ether epoxy resins, such as epoxy compounds having bisphenyl groups, such as bisphenol A type, bisphenol F type, brominated bisphenol A type, hydrogenated bisphenol A type, bisphenol S type, bisphenol AF type and biphenyl type compounds, poly(alkylene glycol) type or alkylene glycol type epoxy compounds, epoxy compounds having naphthalene rings, and epoxy compounds having fluorene groups; polyfunctional glycidyl ester epoxy resins, such as phenol novolac type, ortho-cresol novolac type, tris(hydroxyphenyl)methane type and tetraphenylolethane type resins; glycidyl ester epoxy resins of synthetic fatty acids such as dimer acids; aromatic epoxy resins having glycidylamino groups, such as N,N,N',N'-tetraglycidyl-diaminodiphenylmethane (TGDDM), tetraglycidyl-m-xylylenediamine, triglycidyl-p-aminophenol and N,N-diglycidylaniline; and epoxy compounds having tricyclodecane groups (for example, epoxy compounds obtained using a manufacturing method comprising polymerizing a cresols or phenols, such as dicyclopentadiene or m-cresol, and then reacting with epichlorohydrin). A single epoxy resin (A) can be used or a combination of two or more epoxy resins (A) can be used.

The epoxy resin (A) is preferably one selected from the group consisting of bisphenol A-type epoxy resins, bisphenol F-type epoxy resins, rubber-modified epoxy resins and urethane-modified epoxy resins. This is because it is easy to obtain a composition whereby the storage modulus after curing is 1.0 GPa or lower at −20° C. and 0.2 to 0.7 GPa at 80° C.

Bisphenol A-Type Epoxy Resin

The bisphenol A-type epoxy resin preferably has an epoxy equivalent weight of 180 to 300 g/eq. A single bisphenol A-type epoxy resin can be used or a combination of two or more bisphenol A-type epoxy resins can be used. Specifically, the bisphenol A-type epoxy resin can be selected as appropriate from among, for example, the jER series (827, 828, 834 and the like) manufactured by Japan Epoxy Resin Co., Ltd., the Epiclon series (840, 850 and the like) manufactured by DIC, the Adeka Resin EP-4100 series manufactured by Adeka Corporation, and the like.

Bisphenol F-Type Epoxy Resin

The bisphenol F-type epoxy resin preferably has an epoxy equivalent weight of 150 to 200 g/eq. A single bisphenol F-type epoxy resin can be used or a combination of two or more bisphenol F-type epoxy resins can be used. Specifically, the bisphenol F-type epoxy resin can be selected as appropriate from among, for example, the jER series (806, 807 and the like) manufactured by Japan Epoxy Resin Co., Ltd., the Epiclon series (830, 835 and the like) manufactured by DIC, the Adeka Resin EP-4900 series manufactured by Adeka Corporation, and the like.

Urethane-Modified Epoxy Resin

The structure of the urethane-modified epoxy resin is not particularly limited provided that it is a resin having a urethane bond and two or more epoxy groups in the molecule. A single urethane-modified epoxy resin can be used or a combination of two or more urethane-modified epoxy resins can be used. Specifically, the urethane-modified epoxy resin can be selected as appropriate from among, for example, the Epokey series (803, 802-30CX, 820-40CX, 834 and the like) manufactured by Mitsui Chemicals, Inc., the Adeka Resin EPU series manufactured by Adeka Corporation, and the like.

Rubber-Modified Epoxy Resin (D)

The rubber-modified epoxy resin (D) is not particularly limited provided that it is an epoxy resin which has two or more epoxy groups in the molecule and in which the backbone is a rubber. The rubber that forms the backbone can be, for example, a polybutadiene rubber, an acrylonitrile-butadiene rubber (NBR), a butadiene-acrylonitrile rubber having carboxyl groups at both terminals (carboxyl-terminated butadiene-nitrile rubber: CTBN), a butadiene-acrylonitrile rubber having amino groups at both terminals (amino-terminated butadiene nitrile rubber: ATBN), a butadiene-acrylonitrile rubber having carboxyl groups and amino groups at both terminals (carboxyl-terminated and amino-terminated butadiene-nitrile rubber), and the like. A single rubber-modified epoxy resin (D) can be used or a combination of two or more rubber-modified epoxy resins (D) can be used. Specifically, the rubber-modified epoxy resin can be selected as appropriate from among, for example, the EPR series manufactured by Adeka Corporation, and the like.

The epoxy resin used when manufacturing the rubber-modified epoxy resin (D) is not particularly limited as long as the epoxy equivalent weight thereof is 200 g/eq or higher, and can be a conventional publicly known epoxy resin.

The manufacturing method of the rubber-modified epoxy resin (D) is not particularly limited. For example, the rubber-modified epoxy resin (D) can be manufactured by reacting the rubber with the epoxy at a high epoxy quantity. The epoxy (epoxy resin, for example) used when manufacturing the rubber-modified epoxy resin is not particularly limited. Examples thereof include conventionally known products.

Moreover, in this embodiment, because the epoxy resin used is incorporated in excess during manufacture, the epoxy equivalent weight and added quantity of the rubber-modified epoxy resin (D) means the quantity of the "rubber-modified epoxy resin containing this epoxy".

The rubber-modified epoxy resin (D) can be one obtained by reacting an epoxy resin with an acrylonitrile-butadiene rubber having a carboxyl group and/or an amino group at both terminals. In this case, a content of acrylonitrile in the acrylonitrile-butadiene rubber having a carboxyl group and/or an amino group at both terminals of the rubber-modified epoxy resin (D) is preferably not lower than 15% and not higher than 35%, and more preferably not lower than 20% and not higher than 30%. If the content of acrylonitrile is low, compatibility with the epoxy resin deteriorates and separation occurs. In addition, if the content of acrylonitrile is too high, compatibility is too good, leading to concerns that the heat resistance of a cured product will deteriorate.

In this embodiment, it is preferable to incorporate the rubber-modified epoxy resin (D) in addition to the epoxy resin (A). The rubber-modified epoxy resin (D) exhibits the property of being highly compatible with an oily component. When using the composition according to this embodiment on, for example, a steel plate having an oil surface, because the urethane resin (B) is a highly polar component, the composition according to this embodiment exhibits poor adhesion to the steel plate having an oil surface. By incorporating the rubber-modified epoxy resin (D) in addition to the epoxy resin (A) in the composition according to this embodiment, it is possible to maintain stable adhesion to, for example, a steel plate having an oil surface.

Urethane Resin (B)

The urethane resin (B) is a resin that contains a urethane prepolymer and bisphenol A. The urethane resin (B) is a resin in which the terminal isocyanate of the urethane prepolymer is blocked by at least one of an ϵ-polycaprolactam, an oxime, or a pyrazole, and in which bisphenol A is included in the backbone of the aforementioned urethane prepolymer.

Urethane Prepolymer

The urethane prepolymer used in the urethane resin (B) can be a conventional publicly known prepolymer. The urethane prepolymer is a reaction product obtained by reacting, for example, a polyol compound with a polyisocyanate compound at such quantities that there is an excess of isocyanate groups (NCO groups) in the polyisocyanate compound relative to hydroxy groups (OH groups) in the polyol compound. In addition, the above-mentioned urethane prepolymer preferably contains not less than 0.5 mass % and not more than 10 mass % of NCO groups at molecular terminals.

Polyol Compound

The polyol compound used when manufacturing the urethane prepolymer is not particularly limited as long as the compound contains two or more hydroxy groups. Examples of polyol compounds include polyether polyols, polycarbonate polyols, polyester polyols, other polyols and the combination polyols thereof.

Examples of polyether polyols include polyether polyols obtained by adding at least one type selected from the group consisting of ethylene oxide, propylene oxide, butylene oxide, styrene oxide and polyoxytetramethylene oxide to at least one type of polyhydric alcohol selected from the group consisting of poly(tetramethylene glycol), ethylene glycol, di(ethylene glycol), propylene glycol, di(propylene glycol), glycerine, 1,1,1-trimethylolpropane, 1,2,5-hexane triol, 1,3-butane diol, 1,4-butane diol, 4,4'-dihydroxyphenylpropane, 4,4'-dihydroxyphenylmethane and pentaerythritol; and polyoxytetramethylene oxide. Specific examples of the above-mentioned polyether polyols include polyoxypropylene glycol, polytetramethylene ether glycol, poly(ethylene glycol) and polyoxypropylene triol.

The polycarbonate polyol is not particularly limited as long as the polycarbonate polyol contains a carbonate bond (—O—CO—O—) and two or more hydroxy groups. For example, it is possible to use a compound obtained by subjecting an alkoxy group in a dialkyl carbonate to a transesterification reaction with a group obtained by eliminating a hydrogen atom from a hydroxy group of a polyol compound.

The manufacturing method of the polycarbonate polyol is not particularly limited, and can be a conventional publicly known method. The polycarbonate polyol can be, for example, HO((CH$_2$)$_6$—O—C(=O)—O)$_m$(CH$_2$)$_6$—OH (m is an integer from 2 to 50). Specifically, it is possible to use a polycarbonate polyol able to be obtained from a diol of a straight chain aliphatic hydrocarbon compound having 2 to 10 carbon atoms, such as ethylene glycol and 1,6-hexane diol, a polycarbonate polyol able to be obtained from a diol of an alicyclic hydrocarbon compound having 3 to 10 carbon atoms, such as cyclohexane diol, and the like. Of these, a polycarbonate polyol derived from a diol of an aliphatic hydrocarbon compound having 2 to 10 carbon atoms is preferred from the perspectives of adhesive properties, wettability and ease of procurement of raw materials. In addition, the polycarbonate polyol preferably has a mass-average molecular weight of 1,000 or higher from the perspectives of adhesive properties and wettability. More preferably, the polycarbonate polyol is derived from a diol of a straight chain aliphatic hydrocarbon compound having 6 or more carbon atoms and has a molecular weight of 1,000 or higher from the perspectives of adhesive properties and wettability. A single polycarbonate polyol can be used or a combination of two or more polycarbonate polyols can be used.

Specifically, the polyester polyol can be, for example, a condensation polymer of at least one type selected from the group consisting of ethylene glycol, propylene glycol, butane diol, pentane diol, hexane diol, cyclohexanedimethanol, glycerine, 1,1,1-trimethylolpropane and other low-molecular-weight polyols and at least one type selected from the group consisting of glutaric acid, adipic acid, pimelic acid, suberic acid, sebacic acid, terephthalic acid, isophthalic acid and other low-molecular-weight carboxylic acids and oligomeric acids; and ring-opened polymers of propiolactone, valerolactone, caprolactone and the like.

Specific examples of other polyols include polymeric polyols; polybutadiene polyols; hydrogenated polybutadiene polyols; acrylic polyols and the like; and low-molecular-weight polyols such as ethylene glycol, di(ethylene glycol), propylene glycol, di(propylene glycol), butane diol, pentane diol and hexane diol.

Of the above-mentioned polyols, a polyether polyol having a number average molecular weight of 1,000 to 15,000, and especially 1,000 to 10,000, is preferred from the perspectives of glass transition temperature and physical properties following curing.

A single such polyol compound can be used or a combination of two or more such polyol compounds can be used. Of these, a poly(tetramethylene glycol) or a polycarbonate polyol is particularly preferred. A poly(tetramethylene glycol) or a polycarbonate polyol can improve compatibility with the epoxy resin (A), and a cured product comprising the composition according to this embodiment, which is obtained using this urethane prepolymer, can exhibit high strength and elongation.

Polyisocyanate Compound

The polyisocyanate compound used when manufacturing the urethane prepolymer is not particularly limited as long as the compound contains two or more isocyanate groups in the molecule.

Specific examples of the polyisocyanate compound include aromatic polyisocyanates such as TDI (for example, 2,4-tolylene diisocyanate (2,4-TDI) or 2,6-tolylene diisocyanate (2,6-TDI)), MDI (for example, 4,4'-diphenylmethane diisocyanate (4,4'-MDI) or 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI) and triphenylmethane triisocyanate; hydrogenated compounds thereof; aliphatic polyisocyanates such as ethylene diisocyanate, propylene diisocyanate, tetramethylene diisocyanate, hexamethylene diisocyanate (HDI), trimethylhexamethylene diisocyanate (TMHDI), lysine diisocyanate and norbornane diisocyanate (NBDI); alicyclic polyisocyanates such as transcyclohexane-1,4-diisocyanate, isophorone diisocyanate (IPDI), bis(isocyanatomethyl)cyclohexane (H$_6$XDI) and dicyclohexylmethane diisocyanate (H$_{12}$MDI); carbodiimide-modified polyisocyanates thereof; isocyanurate-modified polyisocyanates thereof; and aryl aliphatic polyisocyanates such as xylylene diisocyanate, and hydrogenated compounds thereof. A single such polyisocyanate compound can be used or a combination of two or more such polyisocyanate compounds can be used.

Of these, hexamethylene diisocyanate and isophorone diisocyanate are particularly preferred as the polyisocyanate compound.

The urethane prepolymer used in the urethane resin (B) can be manufactured by reacting the above-mentioned polyol compound with an excess of the polyisocyanate compound. The blending ratio of the polyol compound and the polyisocyanate compound is preferably such that a molar ratio of isocyanate groups in the polyisocyanate compound to hydroxy groups in the polyol compound (NCO/OH) is 1.2 to 2.5, and more preferably 1.5 to 2.0. If this ratio falls within this range, the viscosity of the urethane prepolymer and the physical properties of the cured product fall within appropriate ranges. In addition, the above-mentioned urethane prepolymer can be manufactured using a method similar to those used for ordinary urethane prepolymers. For example, it is possible to obtain the urethane prepolymer by stirring the polyol compound and the polyisocyanate compound at the blending ratio mentioned above while heating to 50 to 100° C. In addition, it is possible to use a urethanation catalyst, such as an organotin compound, an organic bismuth compound or an amine, if necessary.

In this embodiment, the urethane resin (B) is preferably one obtained by reacting one or more polyol compounds selected from the group consisting of a poly(tetramethylene glycol) and a polycarbonate polyol with one or more isocyanate compounds selected from the group consisting of hexamethylene diisocyanate and isophorone diisocyanate.

In addition, the quantities of the polyisocyanate compound and the polyol compound when manufacturing the urethane prepolymer are such that the NCO group/OH group (equivalence ratio) is preferably 1.2 to 2.5, and more preferably 1.5 to 2.0. If this equivalence ratio falls within this range, the viscosity of the obtained urethane prepolymer is appropriate and the residual quantity of unreacted polyisocyanate compound in the urethane prepolymer can be reduced.

The manufacturing method of the urethane prepolymer is not particularly limited, and can be manufactured by, for example, stirring the polyol compound and the polyisocyanate compound at the equivalence ratio mentioned above while heating to 50 to 130° C. In addition, it is possible to use a urethanation catalyst, such as an organotin compound, an organic bismuth compound or an amine, if necessary.

A single such urethane prepolymer can be used or a combination of two or more such urethane prepolymers can be used.

The average functionality (number of isocyanate groups) of the above-mentioned urethane prepolymer is preferably 2.2 to 3.0, and more preferably 2.4 to 2.8, per molecule and, if converted into mass percentages, is preferably 0.4% or higher, and more preferably 0.5% or higher. The mass-average molecular weight of the above-mentioned urethane prepolymer is preferably 2,000 to 1,000,000, and more preferably 2,000 to 70,000. If the mass-average molecular weight falls within this range, the viscosity, adhesive strength and properties (such as hardness or modulus) following curing of the obtained composition of the present technology are excellent.

In the urethane resin (B), the terminal isocyanate of the urethane prepolymer is blocked by at least one blocking agent selected from the group consisting of an ε-polycaprolactam, an oxime, and a pyrazole. Among an ε-polycaprolactam, an oxime and a pyrazole, an ε-polycaprolactam is preferred as the blocking agent.

By blocking the terminal isocyanate of the urethane prepolymer with at least one blocking agent selected from the group consisting of an ε-polycaprolactam, an oxime, and a pyrazole, the blocking agent is eliminated, the isocyanate is incorporated in the epoxy resin (A) or the curing agent and crosslinking occurs when the composition is cured.

In this embodiment, the content of bisphenol A in the urethane resin (B) is preferably such that the molar ratio of the number of moles of hydroxy groups in the polyol compound and the number of moles of hydroxy groups in the bisphenol A ((polyol-OH)/(BisA-OH)) is not lower than 1/0.1 and not higher than 1/3.0, more preferably not lower than 1/0.5 and not higher than 1/2.5, and further preferably not lower than 1/1.0 and not higher than 1/2.0. If the content of bisphenol A is low, compatibility with the epoxy resin (A) is poor and a cured product obtained from the composition according to this embodiment easily becomes brittle. If the content of bisphenol A is too high, a content of the blocking agent, such as an ε-polycaprolactam, increases and the blocking agent is not eliminated by heating and remains in the composition, meaning that adequate strength cannot be achieved and physical properties deteriorate. Therefore, by setting the content of bisphenol A in the urethane resin (B) to fall within the above-mentioned range, it is possible to improve compatibility with the epoxy resin (A), maintain the strength of a cured product obtained from the composition according to this embodiment, and improve shock resistance. In addition, it is possible to stably maintain shock resistance on plated steel plates and the like.

The content of the urethane resin (B) is preferably not less than 10 parts by mass and not more than 80 parts by mass, more preferably not less than 30 parts by mass and not more than 70 parts by mass, and further preferably not less than 40 parts by mass and not more than 70 parts by mass, per 100 parts by mass of the epoxy resin (A). By setting the content of the urethane resin (B) to fall within the above-mentioned range, it is possible to maintain the effect achieved by incorporating the urethane resin (B).

Curing Agent (C)

The curing agent (C) contained in the composition of the present technology is not particularly limited, and may be one commonly used as a curing agent for epoxy resins. The curing agent may be, for example, dicyandiamide, 4,4-diaminodiphenylsulfone, an imidazole derivative such as 2-n-heptadecylimidazole, isophthalic acid dihydrazide, an N,N-dialkylurea derivative, an N,N-dialkylthiourea derivative, an acid anhydride such as tetrahydrophthalic anhydride, isophorone diamine, m-phenylene diamine, N-aminoethylpiperazine, melamine, guanamine, a boron trifluoride complex, tris(dimethylaminomethyl)phenol, or a polythiol.

The polythiol is not particularly limited as long as the compound contains two or more mercapto groups. Examples of thiols having two mercapto groups include alkylene dithiols such as ethanedithiol, propanedithiol, butanedithiol, pentanedithiol and hexanedithiol; aromatic dithiols such as benzenedithiol, toluene-3,4-dithiol, 3,6-dichloro-1,2-benzenedithiol, 1,5-naphthalenedithiol and 4,4'-thiobisbenzenethiol; dithiols of aromatic ring-containing hydrocarbon compounds, such as benzenedimethanethiol; heterocyclic compounds such as 2-di-n-butylamino-4,6-dimercapto-s-triazine; thia compounds such as 2-mercapto-3-thiahexane-1, 6-dithiol, 5,5-bis(mercaptomethyl)-3,7-dithianonane-1,9-dithiol and 5-(2-mercaptoethyl)-3,7-dithianonane-1,9-dithiol; and hydroxy group-containing compounds such as dimercaptopropanol and dithioerythritol.

Examples of thiols having three or more mercapto groups include trithiols such as trithioglycerine, 1,3,5-triazine-2,4,6-trithiol (trimercapto-triazine), trimethylolpropane tris(thioglycolate), trimethylolpropane tris(thiopropionate), 1,2,4-tris(mercaptomethyl)benzene, 1,3,5-tris(mercaptomethyl)benzene, 2,4,6-tris(mercaptomethyl)mesitylene, tris(mercaptomethyl)isocyanurate, tris(3-mercaptopropyl)isocyanurate and 2,4,5-tris(mercaptomethyl)-1,3-dithiolane; and tetrathiols such as pentaerythritol tetrakis thioglycolate, pentaerythritol tetrakis thiopropionate, 1,2,4,5-tetrakis(mercaptomethyl)benzene, tetramercaptobutane and pentaerythrithiol.

The polythiol can be, for example, a polythiol obtained by introducing a mercapto group at the terminal of a polyether (such as polyoxypropylene glycol) (for example, "QE-340M" manufactured by Toray Fine Chemicals Co., Ltd.).

A combination of two or more of these compounds can be used as the curing agent (C).

The content of the curing agent (C) in the composition of the present technology is not particularly limited, and the optimal quantity will vary according to the type of curing agent used. For example, it is possible to use an optimal quantity for each conventional publicly known curing agent. This optimal quantity is disclosed in, for example, Chapter 3 of "Fundamental review of epoxy resins" (published in 2003 by The Japan Society of Epoxy Resin Technology).

In this way, the composition according to this embodiment is an epoxy resin composition that contains an epoxy resin (A), a urethane resin (B) in which the terminal isocyanate of the urethane prepolymer is blocked by at least one of an ε-polycaprolactam, an oxime, or a pyrazole, and in which bisphenol A is included in the backbone of the aforementioned urethane prepolymer, and a curing agent (C). By blocking the terminal isocyanate of the urethane prepolymer by at least one of an ε-polycaprolactam, an oxime, or a pyrazole and including bisphenol A in the backbone of the urethane prepolymer, it is possible to maintain the strength of a cured product obtained from the composition according to this embodiment, impart adequate elongation and stably improve shock resistance on unplated steel plates, plated steel plates and the like.

In addition to the above-mentioned epoxy resin (A), urethane resin (B) and curing agent (C), the composition according to this embodiment may, if necessary, contain additives at quantities that do not impair the object of the present technology. Examples of additives include plasticizers, fillers, reactive diluents, curing catalysts, thixotropy-imparting agents, silane coupling agents, pigments, dyes, antiaging agents, antioxidants, anti-static agents, flame retardants, drying oils, adhesion-imparting agents, dispersing agents, dehydrating agents, UV absorbents and solvents. Two or more of these additives may be incorporated.

The manufacturing method of the composition according to this embodiment is not particularly limited, and may be a conventional publicly known method. For example, the composition according to this embodiment can be obtained by blending the epoxy resin (A), the urethane resin (B), the curing agent (C) and, if necessary, another component such as a curing accelerator homogeneously at room temperature.

The composition according to this embodiment exhibits excellent shock resistance, and can therefore be advantageously used as a structural adhesive. Here, "structural adhesive" is an adhesive that suffers from little decrease in adhesive properties even when subjected to a heavy load for a long period of time, and is highly reliable (JIS K 6800). For example, the composition according to this embodiment can be used as an adhesive for a structural member in the fields of automobiles and vehicles (shinkansen (bullet trains) and trains), civil engineering, construction, electronics, aircraft and aerospace. The composition according to this embodiment can be used particularly advantageously as an adhesive for a vehicle structure such as an automobile or vehicle (shinkansen (bullet train) or train) or an adhesive for an automobile structure.

In addition to a structural adhesive, the composition according to this embodiment can be used as an adhesive for general use, medical uses, carbon fibers, electronic materials and the like. Adhesives for electronic materials include interlayer adhesives for multilayer substrates such as build up substrates, adhesives for joining optical components, adhesives for bonding optical disks, adhesives for mounting printed wiring boards, die bonding adhesives, adhesives for semiconductors such as underfills, underfills for BGA reinforcing, anisotropic conductive films (ACF) and anisotropic conductive pastes (ACP).

In addition to adhesives, the composition according to this embodiment can be used in general purpose articles in which thermosetting resins such as epoxy resins are used. For example, the composition according to this embodiment can be used in coating materials, coating agents, molded materials (including sheets, films and FRPs), insulating materials (including coatings for printed circuit boards, wires and the like), sealing agents, sealing agents for flat panel displays, binders for fibers, and the like.

EXAMPLES

The present technology is described below in detail using working examples but the present technology is not limited to such working examples.

Preparation of Urethane Resins (B)1 to (B)9

Preparation of Urethane Resin (B)1 ((polyol-OH)/(BisA-OH)=1/2.5, Blocking Agent: ε-polycaprolactam)

100 parts by mass of poly(tetramethylene glycol) (PTMG-2000, manufactured by Mitsubishi Chemical Corporation), 31.1 parts by mass of 2,2-bis(4-hydroxyphenyl)propane (manufactured by Tokyo Chemical Industry Co., Ltd.) and 0.45 parts by mass of trimethylolpropane (manufactured by Tokyo Chemical Industry Co., Ltd.) were dehydrated for 5 hours at 110° C. under reduced pressure. This mixture was then cooled to 60° C., 48.3 parts by mass of hexamethylene diisocyanate (50M-HDI, manufactured by Asahi Kasei Chemicals Corporation) and 5 ppm of dibutyl tin dilaurate (manufactured by Tokyo Chemical Industry Co., Ltd.) were added thereto, and the resulting mixture was allowed to react for 3 hours at 90° C. in a nitrogen atmosphere. Following the reaction, the reaction product was cooled to 60° C., 21.7 parts by mass of ε-polycaprolactam (manufactured by Tokyo Chemical Industry Co., Ltd.) was added thereto as a blocking agent, and the resulting mixture was allowed to react for 1 hour at 90° C. When FT-IR measurements were carried out following the reaction, a peak at 2265 cm$^{-1}$, which is attributable to isocyanate groups, was not observed. Urethane resin (B)1, in which (polyol-OH)/(BisA-OH) was 1/2.5, was obtained from this process.

Preparation of Urethane Resin (B)2 ((polyol-OH)/(BisA-OH)=1/2.0, Blocking Agent: ε-polycaprolactam)

Urethane resin (B)2 was prepared in the same way as urethane resin (B)1 above, except that the quantities were changed to 23.3 parts by mass of 2,2-bis(4-hydroxyphenyl)propane, 39.7 parts by mass of hexamethylene diisocyanate and 17.8 parts by mass of ε-polycaprolactam. Urethane resin (B)2, in which (polyol-OH)/(BisA-OH) was 1/2.0, was obtained from this process.

Preparation of Urethane Resin (B)3 ((polyol-OH)/(BisA-OH)=1/1.5, Blocking Agent: ε-polycaprolactam)

Urethane resin (B)3 was prepared in the same way as urethane resin (B)1 above, except that the quantities were changed to 17.4 parts by mass of 2,2-bis(4-hydroxyphenyl)propane, 33.3 parts by mass of hexamethylene diisocyanate and 15.0 parts by mass of ε-polycaprolactam. Urethane resin (B)3, in which (polyol-OH)/(BisA-OH) was 1/1.5, was obtained from this process.

Preparation of Urethane Resin (B)4 ((polyol-OH)/(BisA-OH)=1/1.0, Blocking Agent: ε-polycaprolactam)

Urethane resin (B)4 was prepared in the same way as urethane resin (B)1 above, except that the quantities were changed to 11.7 parts by mass of 2,2-bis(4-hydroxyphenyl)propane, 27.0 parts by mass of hexamethylene diisocyanate and 12.1 parts by mass of ε-polycaprolactam. Urethane resin (B)4, in which (polyol-OH)/(BisA-OH) was 1/1.0, was obtained from this process.

Preparation of Urethane Resin (B)5 ((polyol-OH)/(BisA-OH)=1/0.5, Blocking Agent: ε-polycaprolactam)

Urethane resin (B)5 was prepared in the same way as urethane resin (B)1 above, except that the quantities were changed to 5.8 parts by mass of 2,2-bis(4-hydroxyphenyl)propane, 20.5 parts by mass of hexamethylene diisocyanate and 9.2 parts by mass of ε-polycaprolactam. Urethane resin (B)5, in which (polyol-OH)/(BisA-OH) was 1/0.5, was obtained from this process.

Preparation of Urethane Resin (B)6 ((polyol-OH)/(BisA-OH)=1/2.5, Blocking Agent: Methyl Ethyl Ketone Oxime)

Urethane resin (B)6 was prepared in the same way as urethane resin (B)1 above, except that 16.7 parts by mass of methyl ethyl ketone oxime (manufactured by Tokyo Chemical Industry Co., Ltd.) was used as the blocking agent instead of the ε-polycaprolactam. Urethane resin (B)6, in which (polyol-OH)/(BisA-OH) was 1/2.5, was obtained from this process.

Preparation of Urethane Resin (B)7 ((polyol-OH)/(BisA-OH)=1/1.5, Blocking Agent: 3,5-dimethylpyrazole)

100 parts by mass of poly(tetramethylene glycol) (PTMG-2000, manufactured by Mitsubishi Chemical Corporation) and 17.5 parts by mass of 2,2-bis(4-hydroxyphenyl)propane (manufactured by Tokyo Chemical Industry Co., Ltd.) were dehydrated for 5 hours at 110° C. under reduced pressure. This mixture was then cooled to 60° C., 27.8 parts by mass of hexamethylene diisocyanate (50M-HDI, manufactured by Asahi Kasei Chemicals Corporation) and 5 ppm of dibutyl tin dilaurate (manufactured by Tokyo Chemical Industry Co., Ltd.) were added thereto, and the resulting mixture was allowed to react for 3 hours at 90° C. in a nitrogen atmosphere. Following the reaction, the reaction product was cooled to 60° C., 16.7 parts by mass of 3,5-dimethylpyrazole (manufactured by Tokyo Chemical Industry Co., Ltd.) was added thereto as a blocking agent, and the resulting mixture was allowed to react for 1 hour at 90° C. When FT-IR measurements were carried out following the reaction, a peak at 2265 $cm^{-1}$, which is attributable to isocyanate groups, was not observed. Urethane resin (B)7, in which (polyol-OH)/(BisA-OH) was 1/1.5, was obtained from this process.

Preparation of Urethane Resin (B)8 ((polyol-OH)/(BisA-OH)=1/2.5, Blocking Agent: Methanol)

Urethane resin (B)8 was prepared in the same way as urethane resin (B)1 above, except that 6.1 parts by mass of methanol (manufactured by Kanto Chemical Co., Ltd.) was used as the blocking agent instead of the ε-polycaprolactam. Urethane resin (B)8, in which (polyol-OH)/(BisA-OH) was 1/2.5, was obtained from this process.

Preparation of Urethane Resin (B)9 ((polyol-OH)/(BisA-OH)=1/0, Blocking Agent: ε-polycaprolactam)

Urethane resin (B)9 was prepared in the same way as urethane resin (B)1 above, except that 2,2-bis(4-hydroxyphenyl)propane was not added and the quantities were changed to 12.8 parts by mass of hexamethylene diisocyanate and 5.75 parts by mass of ε-polycaprolactam. Urethane resin (B)9, in which (polyol-OH)/(BisA-OH) was 1/0, was obtained from this process.

The (polyol-OH)/(BisA-OH) values of urethane resins (B)1 to (B)9 and the blocking agents used to block the terminal isocyanate of the urethane prepolymer are shown in Table 1.

Synthesis of Rubber-Modified Epoxy Resin (D)1

Rubber-modified epoxy resin (D)1 was obtained by causing 100 parts by mass of a bisphenol A type liquid epoxy resin (trade name "EP4100E", manufactured by Adeka Corporation, epoxy equivalent weight: 190 g/eq), 50 parts by mass of CTBN (trade name "Hycar 1300×13", acrylonitrile content: 26%, manufactured by PIT Japan) and 1 part by mass of triphenylphosphine (manufactured by Tokyo Chemical Industry Co., Ltd.) as a catalyst to react for 2 hours at 110° C.

Synthesis of Rubber-Modified Epoxy Resin (D)2

Rubber-modified epoxy resin (D)2 was obtained by blending 100 parts by mass of a bisphenol A type epoxy resin (trade name "JER 834", manufactured by Japan Epoxy Resin Co., Ltd., epoxy equivalent weight: 250 g/eq), 50 parts by mass of CTBN and 1 part by mass of triphenylphosphine (manufactured by Tokyo Chemical Industry Co., Ltd.) as a catalyst, and causing these components to react for 2 hours at 110° C.

Synthesis of Epoxy Resin Composition

The components shown in Table 1 were blended at the added quantities (parts by mass) shown in Table 1 and mixed homogeneously so as to prepare the compositions shown in Table 1. The added amounts (parts by mass) of each ingredient in the Working Examples and Comparative Examples are shown in Table 1.

Evaluation of Shock Resistance

An epoxy resin composition obtained as described above was stirred for 5 minutes under reduced pressure. Using an unplated steel plate (steel plate) and a molten zinc-plated steel plate as adherends, the epoxy resin composition was coated on the surface of the adherend so that the thickness of the adhesive was approximately 0.15 mm, and the adhesive was cured for 20 minutes at 170° C. so as to obtain a test sample. In an impact shear strength test, the impact shear strength (N/mm) was measured in accordance with the dynamic impact wedge method described in ISO 11343. An adherend measuring 0.8 mm×25 mm×100 mm was used. The impact shear strength test results are shown in Table 1.

TABLE 1

| | | Working Example 1 | Working Example 2 | Working Example 3 | Working Example 4 | Working Example 5 | Working Example 6 |
|---|---|---|---|---|---|---|---|
| Epoxy resin | | 100 | 100 | 100 | 100 | 100 | 100 |
| Urethane resin (B)1 | (polyol-OH)/(BisA-OH) = 1/2.5, blocking agent: ε-polycaprolactam | 30 | 50 | 70 | | | |
| Urethane resin (B)2 | (polyol-OH)/(BisA-OH) = 1/2.0, blocking agent: ε-polycaprolactam | | | | | | |
| Urethane resin (B)3 | (polyol-OH)/(BisA-OH) = 1/1.5, blocking agent: ε-polycaprolactam | | | | | | |
| Urethane resin (B)4 | (polyol-OH)/(BisA-OH) = 1/1.0, blocking agent: ε-polycaprolactam | | | | 50 | | |
| Urethane resin (B)5 | (polyol-OH)/(BisA-OH) = 1/0.5, blocking agent: ε-polycaprolactam | | | | | 50 | |
| Urethane resin (B)6 | (polyol-OH)/(BisA-OH) = 1/2.5, blocking agent: methyl ethyl ketone oxime | | | | | | 50 |
| Urethane resin (B)7 | (polyol-OH)/(BisA-OH) = 1/1.5, blocking agent: 3,5-dimethylpyrazole | | | | | | |
| Urethane resin (B)8 | (polyol-OH)/(BisA-OH) = 1/2.5, blocking agent: methanol | | | | | | |
| Urethane resin (B)9 | (polyol-OH)/(BisA-OH) = 1/0, blocking agent: ε-polycaprolactam | | | | | | |
| Curing agent (C) | | 6.0 | 6.0 | 6.0 | 6.0 | 6.0 | 6.0 |
| Rubber-modified epoxy resin (D)1 | | | | | | | |
| Rubber-modified epoxy resin (D)2 | | | | | | | |
| Curing accelerator | | 1.4 | 1.4 | 1.4 | 1.4 | 1.4 | 1.4 |
| Thixotropic agent | | 3.9 | 4.5 | 5.1 | 4.5 | 4.5 | 4.5 |
| Adhesion-imparting agent | | 1.3 | 1.5 | 1.7 | 1.5 | 1.5 | 1.5 |
| Impact shear strength (N/mm) | Steel plate | 29 | 32 | 33 | 28 | 29 | 26 |
| | Alloyed molten zinc-plated steel plate | 25 | 26 | 28 | 33 | 26 | 25 |

| | | Working Example 7 | Working Example 8 | Working Example 9 | Working Example 10 | Working Example 11 | Working Example 12 |
|---|---|---|---|---|---|---|---|
| Epoxy resin | | 100 | 100 | 100 | 100 | 100 | 100 |
| Urethane resin (B)1 | (polyol-OH)/(BisA-OH) = 1/2.5, blocking agent: ε-polycaprolactam | 50 | 50 | | | | 30 |

TABLE 1-continued

| | | | | | | | |
|---|---|---|---|---|---|---|---|
| Urethane resin (B)2 | (polyol-OH)/(BisA-OH) = 1/2.0, blocking agent: ε-polycaprolactam | | 50 | | | | |
| Urethane resin (B)3 | (polyol-OH)/(BisA-OH) = 1/1.5, blocking agent: ε-polycaprolactam | | | 50 | | | |
| Urethane resin (B)4 | (polyol-OH)/(BisA-OH) = 1/1.0, blocking agent: ε-polycaprolactam | | | | | | |
| Urethane resin (B)5 | (polyol-OH)/(BisA-OH) = 1/0.5, blocking agent: ε-polycaprolactam | | | | | | |
| Urethane resin (B)6 | (polyol-OH)/(BisA-OH) = 1/2.5, blocking agent: methyl ethyl ketone oxime | | | | | | |
| Urethane resin (B)7 | (polyol-OH)/(BisA-OH) = 1/1.5, blocking agent: 3,5-dimethylpyrazole | | | | 40 | | |
| Urethane resin (B)8 | (polyol-OH)/(BBA-OH) = 1/2.5, blocking agent: methanol | | | | | | |
| Urethane resin (B)9 | (polyol-OH)/(BisA-OH) = 1/0, blocking agent: ε-polycaprolactam | | | | | | |
| Curing agent (C) | | 8.5 | 11.1 | 8.5 | 8.5 | 8.5 | 6.0 |
| Rubber-modified epoxy resin (D)1 | | 50 | 100 | 50 | 50 | 50 | |
| Rubber-modified epoxy resin (D)2 | | | | | | | 100 |
| Curing accelerator | | 1.7 | 2.2 | 1.7 | 1.7 | 1.7 | 1.4 |
| Thixotropic agent | | 6.0 | 7.5 | 6.0 | 6.0 | 6.0 | 3.9 |
| Adhesion-imparting agent | | 2.0 | 2.5 | 2.0 | 2.0 | 2.0 | 1.3 |
| Impact shear strength (N/mm) | Steel plate | 29 | 28 | 31 | 35 | 36 | 31 |
| | Alloyed molten zinc-plated steel plate | 23 | 23 | 23 | 22 | 22 | 29 |

| | | Working Example 13 | Working Example 14 | Working Example 15 | Working Example 16 | Working Example 17 |
|---|---|---|---|---|---|---|
| Epoxy resin | | 100 | 100 | 100 | 100 | 100 |
| Urethane resin (B)1 | (polyol-OH)/(BisA-OH) = 1/2.5, blocking agent: ε-polycaprolactam | 50 | 70 | | | |
| Urethane resin (B)2 | (polyol-OH)/(BisA-OH) = 1/2.0, blocking agent: ε-polycaprolactam | | | | | |
| Urethane resin (B)3 | (polyol-OH)/(BisA-OH) = 1/1.5, blocking agent: ε-polycaprolactam | | | | | |
| Urethane resin (B)4 | (polyol-OH)/(BisA-OH) = 1/1.0, blocking agent: ε-polycaprolactam | | | 50 | | |
| Urethane resin | (polyol-OH)/(BisA-OH) = | | | | 50 | |

TABLE 1-continued

| | | | | | | |
|---|---|---|---|---|---|---|
| (B)5 | 1/0.5, blocking agent: ε-polycaprolactam | | | | | |
| Urethane resin (B)6 | (polyol-OH)/ (BisA-OH) = 1/2.5, blocking agent: methyl ethyl ketone oxime | | | | | 50 |
| Urethane resin (B)7 | (polyol-OH)/ (BisA-OH) = 1/1.5, blocking agent: 3,5-dimethylpyrazole | | | | | |
| Urethane resin (B)8 | (polyol-OH)/ (Bis-OH) = 1/2.5, blocking agent: methanol | | | | | |
| Urethane resin (B)9 | (polyol-OH)/ (BisA-OH) = 1/0, blocking agent: ε-polycaprolactam | | | | | |
| Curing agent (C) | | 6.0 | 6.0 | 6.0 | 6.0 | 6.0 |
| Rubber-modified epoxy resin (D)1 | | | | | | |
| Rubber-modified epoxy resin (D)2 | | 100 | 100 | 100 | 100 | 100 |
| Curing accelerator | | 1.4 | 1.4 | 1.4 | 1.4 | 1.4 |
| Thixotropic agent | | 4.5 | 5.1 | 4.5 | 4.5 | 4.5 |
| Adhesion-imparting agent | | 1.5 | 1.7 | 1.5 | 1.5 | 1.5 |
| Impact shear strength (N/mm) | Steel plate | 37 | 35 | 32 | 32 | 30 |
| | Alloyed molten zinc-plated steel plate | 33 | 31 | 33 | 30 | 25 |

| | | Comparative example 1 | Comparative example 2 | Comparative example 3 |
|---|---|---|---|---|
| Epoxy resin | | 100 | 100 | 100 |
| Urethane resin (B)1 | (polyol-OH)/ (BisA-OH) = 1/2.5, blocking agent: ε-polycaprolactam | | | |
| Urethane resin (B)2 | (polyol-OH)/ (BisA-OH) = 1/2.0, blocking agent: ε-polycaprolactam | | | |
| Urethane resin (B)3 | (polyol-OH)/ (BisA-OH) = 1/1.5, blocking agent: ε-polycaprolactam | | | |
| Urethane resin (B)4 | (polyol-OH)/ (BisA-OH) = 1/1.0, blocking agent: ε-polycaprolactam | | | |
| Urethane resin (B)5 | (polyol-OH)/ (BisA-OH) = 1/0.5, blocking agent: ε-polycaprolactam | | | |
| Urethane resin (B)6 | (polyol-OH)/ (BisA-OH) = 1/2.5, blocking agent: methyl ethyl ketone oxime | | | |
| Urethane resin (B)7 | (polyol-OH)/ (BisA-OH) = 1/1.5, blocking agent: 3,5-dimethylpyrazole | | | |
| Urethane resin (B)8 | (polyol-OH)/ (BBA-OH) = 1/2.5, blocking agent: methanol | | 50 | |

TABLE 1-continued

| | | | | |
|---|---|---|---|---|
| Urethane resin (B)9 | (polyol-OH)/(BisA-OH) = 1/0, blocking agent: ε-polycaprolactam | | | 50 |
| Curing agent (C) | | 6.0 | 6.0 | 6.0 |
| Rubber-modified epoxy resin (D)1 | | | | |
| Rubber-modified epoxy resin (D)2 | | | | |
| Curing accelerator | | 1.4 | 1.4 | 1.4 |
| Thixotropic agent | | 3.0 | 4.5 | 4.5 |
| Adhesion-imparting agent | | 1.0 | 1.5 | 1.5 |
| Impact shear strength (N/mm) | Steel plate | Not measurable | Not measurable | Not measurable |
| | Alloyed molten zinc-plated steel plate | Not measurable | Not measurable | Not measurable |

Components other than the urethane resins (B)1 to (B)9 and the rubber-modified epoxy resins (D)1 and (D)2 shown in Table 1 are as follows.
Epoxy resin (A): Semi-solid epoxy resin (trade name "JER 834", manufactured by Japan Epoxy Resin Co., Ltd.)
Curing agent (C): Dicyandiamide (trade name "DICY 15", manufactured by Japan Epoxy Resin Co., Ltd.)
Curing accelerator: 3,4-dichlorophenyl-1,1-dimethylurea ("DCMU", manufactured by Hodogaya Chemical Co., Ltd.)
Thixotropic agent: Aerosil ("RY-2005", manufactured by Nippon Aerosil (3 parts by mass added relative to total resin content))
Adhesion-imparting agent: Epoxy silane ("KBM-403", manufactured by Shin-Etsu Chemical Co., Ltd. (1 part by mass added relative to total resin content))

As is clear from the results shown in Table 1, it was not possible to measure the shock resistance on the steel plate and alloyed molten zinc-plated steel plate adherends for Comparative Examples 1 to 3. It can be said that Comparative Example 1 did not contain, as a component of the resin composition, a urethane resin (B) in which the terminal isocyanate of the urethane prepolymer is blocked by at least one of an ε-polycaprolactam, an oxime, or a pyrazole, and in which bisphenol A is included in the backbone of the aforementioned urethane prepolymer, and could not therefore give a cured product having adequate shock resistance when the resin composition was cured. Comparative Example 2 used methanol as the blocking agent for the epoxy resin (A), but methanol is not eliminated from the terminal isocyanate of the urethane prepolymer when the resin composition is heated. As a result, when the resin composition was cured, the urethane resin (B) was not incorporated in the epoxy resin (A) and remained separate, meaning that an extremely brittle cured product was obtained. It can be said that shock resistance was inadequate because of this. Because Comparative Example 3 contained, as a component of the resin composition, a urethane resin (B) in which bisphenol A is not included in the backbone of the urethane prepolymer, the cured product obtained by curing the resin composition became rubber-like and was extremely soft at room temperature. As a result, the obtained cured product was brittle and exhibited low strength, and it can therefore be said that shock resistance of the cured product was inadequate.

Conversely, Working Examples 1 to 17 exhibited excellent shock resistance on the steel plate and alloyed molten zinc-plated steel plate adherends. Comparing Working Examples 1 to 3, Working Example 3 exhibited higher impact shear strength and shock resistance on the steel plate and alloyed molten zinc-plated steel plate adherends than Working Examples 1 and 2. It is thought that this is because the content of the urethane resin (B), in which the terminal isocyanate of the urethane prepolymer is blocked by ε-polycaprolactam and in which bisphenol A is included in the backbone of the urethane prepolymer, is increased, meaning that when the resin composition is cured, the quantity of ε-polycaprolactam, which had blocked the terminal isocyanate of the urethane prepolymer, eliminated is increased, thereby enabling an increase in the degree of reaction between the isocyanate and the epoxy resin (A). It can be said that Working Example 3 exhibits higher impact shear strength on adherends than Working Examples 1 and 2 because of this.

Comparing Working Examples 2, 4 and 5, these exhibit high impact shear strength and stable shock resistance on the steel plate and alloyed molten zinc-plated steel plate adherends. It can be said that the shock resistance of the cured products is stably increased due to the (polyol-OH)/(BisA-OH) value falling within the prescribed range.

Comparing Working Examples 2 and 6, Working Example 2 exhibited higher impact shear strength and more stable shock resistance on the steel plate and alloyed molten zinc-plated steel plate adherends than Working Example 6. It can be said that this is because ε-polycaprolactam is more preferred than methyl ethyl ketone oxime as the blocking agent that caps the terminal isocyanate of the urethane prepolymer.

Comparing Working Examples 7 and 8, both exhibit high impact shear strength and stable shock resistance on the steel plate and alloyed molten zinc-plated steel plate adherends. It can be said that this is because the resin composition exhibits high impact shear strength and stable shock resistance even if the resin composition further contains the rubber-modified epoxy resin (D)1. Comparing Working Examples 7, 9 and 10, all exhibited high impact shear strength and stable shock resistance on the steel plate and alloyed molten zinc-plated steel plate adherends. It can be said that the shock resistance of the cured products is stably increased due to the (polyol-OH)/(BisA-OH) value falling within the prescribed range even if the resin composition further contains the rubber-modified epoxy resin (D)1. Furthermore, Working Example 11, in which 3,5-dimethylpyrazole was used as the blocking agent, exhibited high impact shear strength and stable shock resistance on the steel plate and alloyed molten zinc-plated steel plate adherends. Impact shear strength on the steel plate was particularly high. It can be said that this is because 3,5-dimethylpyrazole, instead of ε-polycaprolactam, can also be suitably used as the blocking agent.

Compared to Working Examples 1 to 6, Working Examples 12 to 17 exhibited equivalent or higher impact shear strength and stable shock resistance on the steel plate and alloyed molten zinc-plated steel plate adherends. It can be said that this is because incorporating the rubber-modified epoxy resin (D)2, produces equivalent or higher impact shear strength and enables stable shock resistance in the same way as when the rubber-modified epoxy resin (D)1 is incorporated.

Therefore, it was understood that a cured product obtained from the epoxy resin composition of the present technology exhibits stably increased impact shear strength and excellent shock resistance on the steel plate and alloyed molten zinc-plated steel plate adherends. Furthermore, such a cured product stably exhibits high shock resistance on a coated plate, such as a structural member of an automobile or vehicle, in the same way as on a coated steel plate. Therefore, a cured product obtained from the epoxy resin composition of the present technology stably exhibits excellent shock resistance, and can therefore give a highly reliable adhesive, and especially a structural adhesive.

What is claimed is:

1. An epoxy resin composition comprising:
   an epoxy resin (A),
   a urethane resin (B) comprising a urethane prepolymer formed by reacting one or more polyol compounds, one or more isocyanate compounds, and bisphenol A to form a urethane prepolymer having a terminal isocyanate, reacting the urethane prepolymer having the terminal isocyanate with at least one of an $\epsilon$-polycaprolactam, an oxime, or a pyrazole to block the terminal isocyanate, and
   a curing agent (C) selected from the group consisting of dicyandiamide, 4,4-diaminodiphenylsulfone, an imidazole derivative, isophthalic acid dihydrazide, an N,N-dialkylurea derivative, an N,N-dialkylthiourea derivative, an acid anhydride, isophorone diamine, m-phenylene diamine, N-aminoethylpiperazine, melamine, guanamine, a boron trifluoride complex, tris(dimethylaminomethyl)phenol, a polythiol, and combinations thereof,
   wherein a ratio of a number of moles of hydroxy groups on the one or more polyol compounds that are reacted to a number of moles of hydroxy groups on the bisphenol A that are reacted ((polyol-OH)/(BisA-OH)) is from about 1:0.1 to about 1:3.0.

2. The epoxy resin composition according to claim 1, wherein the urethane resin (B) is obtained by reacting one or more polyol compounds is selected from the group consisting of a poly(tetramethylene glycol) and a polycarbonate polyol and the one or more isocyanate compounds is selected from the group consisting of hexamethylene diisocyanate and isophorone diisocyanate.

3. The epoxy resin composition according to claim 2, wherein a content of the urethane resin (B) is not less than 10 parts by mass and not more than 80 parts by mass per 100 parts by mass of the epoxy resin (A).

4. The epoxy resin composition according to claim 3, comprising a rubber-modified epoxy resin (D).

5. The epoxy resin composition according to claim 2, comprising a rubber-modified epoxy resin (D).

6. The epoxy resin composition according to claim 1, wherein a content of the urethane resin (B) is not less than 10 parts by mass and not more than 80 parts by mass per 100 parts by mass of the epoxy resin (A).

7. The epoxy resin composition according to claim 1, comprising a rubber-modified epoxy resin (D).

8. The epoxy resin composition according to claim 1, wherein the curing agent (C) is selected from the group consisting of dicyandiamide, 4,4-diaminodiphenylsulfone, 2-n-heptadecylimidazole, isophthalic acid dihydrazide, an N,N-dialkylurea derivative, an acid anhydride, isophorone diamine, m-phenylene diamine, N-aminoethylpiperazine, melamine, guanamine, a boron trifluoride complex, tris(dimethylaminomethyl)phenol, and a polythiol.

9. The epoxy resin composition according to claim 1, wherein the curing agent (C) is dicyandiamide.

10. An epoxy resin composition comprising:
    an epoxy resin (A),
    a urethane resin (B) comprising a urethane prepolymer formed by reacting one or more polyol compounds, one or more isocyanate compounds, and bisphenol A to form a urethane prepolymer having a terminal isocyanate, reacting the urethane prepolymer having the terminal isocyanate with at least one of an $\epsilon$-polycaprolactam, an oxime, or a pyrazole to block the terminal isocyanate, and
    a curing agent (C) selected from the group consisting of 4,4-diaminodiphenylsulfone, an imidazole derivative, isophthalic acid dihydrazide, an N,N-dialkylurea derivative, an N,N-dialkylthiourea derivative, an acid anhydride, isophorone diamine, m-phenylene diamine, N-aminoethylpiperazine, melamine, a boron trifluoride complex, tris(dimethylaminomethyl)phenol, a polythiol, and combinations thereof,
    wherein a ratio of a number of moles of hydroxy groups on the one or more polyol compounds that are reacted to a number of moles of hydroxy groups on the bisphenol A that are reacted ((polyol-OH)/(BisA-OH)) is from about 1:0.1 to about 1:3.0.

* * * * *